United States Patent
Zhong et al.

(10) Patent No.: US 11,349,129 B1
(45) Date of Patent: May 31, 2022

(54) PREPARATION METHOD OF THE MATRIX MATERIAL FOR THE GAS DIFFUSION LAYER OF A FUEL CELL

(71) Applicant: National Engineering Research Center of Advanced Energy Storage Materials (Shenzhen) Co., Ltd, Shenzhen (CN)

(72) Inventors: Faping Zhong, Shenzhen (CN); Jinchun Xiao, Shenzhen (CN); Jianqi Li, Shenzhen (CN); Changping Fu, Shenzhen (CN); Xiaobing Huang, Shenzhen (CN)

(73) Assignee: NATIONAL ENGINEERING RESEARCH CENTER OF ADVANCED ENERGY STORAGE MATERIALS (SHENZHEN) CO., LTD, Shenzhen (CN)

( * ) Notice: Subject to any disclaimer, the term of this patent is extended or adjusted under 35 U.S.C. 154(b) by 0 days.

(21) Appl. No.: 17/341,293

(22) Filed: Jun. 7, 2021

(30) Foreign Application Priority Data

May 13, 2021 (CN) .......................... 202110522633.9

(51) Int. Cl.
| | | |
|---|---|---|
| *C23C 18/36* | (2006.01) | |
| *C23C 28/02* | (2006.01) | |
| *C25D 3/12* | (2006.01) | |
| *C25D 3/56* | (2006.01) | |
| *C25D 5/14* | (2006.01) | |
| *C25D 5/50* | (2006.01) | |
| *C25D 5/56* | (2006.01) | |
| *H01M 4/88* | (2006.01) | |
| *H01M 8/10* | (2016.01) | |
| *H01M 8/1004* | (2016.01) | |
| *H01M 4/04* | (2006.01) | |
| *H01M 4/90* | (2006.01) | |
| *H01M 4/86* | (2006.01) | |
| *H01M 8/1041* | (2016.01) | |
| *H01M 8/1088* | (2016.01) | |
| *H01M 8/1067* | (2016.01) | |

(52) U.S. Cl.
CPC ....... *H01M 4/8807* (2013.01); *H01M 4/0452* (2013.01); *H01M 4/8657* (2013.01); *H01M 4/8853* (2013.01); *H01M 4/905* (2013.01); *H01M 4/9075* (2013.01); *H01M 8/1004* (2013.01); *H01M 8/1055* (2013.01); *H01M 8/1067* (2013.01); *H01M 8/1088* (2013.01); *H01M 2300/0094* (2013.01)

(58) Field of Classification Search
None
See application file for complete search history.

(56) References Cited

U.S. PATENT DOCUMENTS

2019/0067703 A1* 2/2019 Okuno .................... B32B 15/01

* cited by examiner

*Primary Examiner* — Haroon S. Sheikh
(74) *Attorney, Agent, or Firm* — Getech Law LLC; Jun Ye

(57) ABSTRACT

The invention provides a preparation method of the matrix material for the gas diffusion layer of a fuel cell. The matrix material is obtained on the polyurethane sponge through the following process: conductively treating, electroplating, dissolving nickel by electrolysis, heat-treating, tungsten-nickel alloy electroplating, heat-treating, rolling. The mass content of the metal nickel of the matrix material is 88~92%, and the mass content of the metal tungsten is 8~12%. The material prepared by the invention has a high specific surface area, excellent thermal conductivity and gas permeability performance, excellent electrical corrosion resistance and oxidation resistance. After being prepared as the gas diffusion layer, as the diffusion layer and fuel cell electrode are closely connected, the material can effectively resist the electrochemical corrosion of the diffusion layer caused by the electrochemical reaction and is suitable for the matrix material of the gas diffusion layer.

8 Claims, No Drawings

PREPARATION METHOD OF THE MATRIX MATERIAL FOR THE GAS DIFFUSION LAYER OF A FUEL CELL

TECHNICAL FIELD

The invention relates to a material preparation method for the fuel cell, in particular to a preparation method of the matrix material for the gas diffusion layer of a fuel cell.

BACKGROUND

Carbon fiber paper or carbon fiber cloth is commonly used as the matrix material of the gas diffusion layer of the polymer electrolyte membrane fuel cell. Carbon fiber cloth and carbon fiber paper are characterized by lightness, large porosity, and are mainly monopolized by manufacturers such as Toray (Japan) and Ballard (Canada). However, the thermal conductivity, electrical resistance, strength and other properties of carbon fiber paper and carbon fiber cloth still cannot meet the continuous improvement requirements of polymer electrolyte membrane fuel cells. It is necessary to find a suitable material to replace carbon fiber paper or carbon fiber cloth. Although porous metal materials such as porous nickel have lower electrical resistance and excellent thermal conductivity than carbon fiber, they are not resistant to electrochemical corrosion, and the oxidation resistance and strength performance are not ideal.

SUMMARY

The invention aims to provide a preparation method of the matrix material for the gas diffusion layer of the polymer electrolyte membrane fuel cell. The material prepared by this method has better electrochemical corrosion, oxidation resistance and strength performance, and is more suitable as the matrix material for the gas diffusion layer of the polymer electrolyte membrane fuel cell. The invention is realized by the following scheme.

A preparation method of the matrix material for the gas diffusion layer of a fuel cell, a polyurethane sponge with a thickness of 0.5 to 1 mm has been subjected to conductivity treatment, the conductive treatment for the sponge can be conducted by using methods in the prior art, for example, physical vapor deposition of nickel, chemical nickel plating and conductive carbon coating, etc. using the prior art nickel plating method to deposit metallic nickel on the conductive polyurethane sponge to from a sponge nickel material; the mentioned sponge nickel material is used as the anode, the metal nickel is used as the cathode, using electrolytic nickel solution commonly used in the prior art, such as Watt electroplating nickel solution, sulfamate acid electroplating nickel, etc., electrolytic treatment for 10~60 minutes under the condition of temperature 30~40° C. and current density 10~30 A/dm$^2$; the electrolytically treated sponge nickel material is incinerated in an oxygen-containing environment, and then heat-treated based on 10~20 minutes per square meter of the material in a reducing atmosphere at 800~1100° C. to form a porous nickel material; The porous nickel material is plated with nickel-tungsten alloy by electroplating, and then heat-treated at 800~1100° C. in a reducing atmosphere based on 10~60 minutes per square meter of material, and finally rolled to 0.1~0.2 mm, then the matrix material for the gas diffusion layer of a fuel cell is prepared; In the above mentioned matrix material, the total metal content per square meter of the matrix material is 1500~3000 grams, in which the mass content of metallic nickel is 88~92%, and the mass content of metallic tungsten is 8~12%, the rest are impurities.

The nickel-tungsten alloy in the above preparation process can be electroplated for a certain period of time according to the amount of metal with the commonly used nickel-tungsten electroplating process in the prior art, such as: nickel sulfate 45~65 g/L, sodium tungstate 70~80 g/L, triamine citrate 10~30 g/L; 15~30 A/dm$^2$ current density for electroplating, the electroplating temperature is 40~55° C., the pH is 6.5~7.5. Using the preparation method of the invention, the plating time is needed to be controlled as 10~60 min per square meter.

It is preferable to use a polyurethane sponge with high porosity as the matrix material, with an average pore diameter of 30~50 m, filament diameter of 5~30 µm (it should have a lower limit), and a porosity of over 75%.

In order to improve the dispersity performance of the conductive sponge material in the subsequent electroplating metal, the conductive treatment process is preferably as: electroless nickel plating is preferably used to plate nickel on the polyurethane sponge matrix material, and the temperature is 60~70° C., using 15~18 KHz ultrasonic treatment for 2~5 min during plating.

Before the electrolytically treated sponge nickel material is incinerated in an oxygen-containing environment, water is sprayed uniformly on the material to keep the water content of the material at 30~40%.

In order to achieve the required thickness, the rolling process of the porous nickel-tungsten material after the second heat treatment is that using a metal alloy roll with a roll diameter of 250~300 mm and a roll weight of 350~380 KG, and the rolling time is 6~60 seconds per square meter of material.

Compared with the prior art, the advantages of the invention are:

1. The porous nickel-tungsten alloy material prepared by the invention has a porosity of more than 75%, a high specific surface area, excellent thermal conductivity and gas permeability performance; the material is used as the positive electrode, the calomel electrode is used as the negative electrode, and sodium chloride aqueous solution is used as electrolyte, treated with an applied potential of 1.45V for 75 h, with the weight loss rate of the material less than 5%, indicating that the material has good electrical corrosion resistance. After being prepared as the gas diffusion layer, as the diffusion layer and fuel cell electrode are closely connected, the material can effectively resist the electrochemical corrosion of the diffusion layer caused by the electrochemical reaction and is suitable for the matrix material of the gas diffusion layer.

2. In the preparation method of the invention, the sponge nickel material is used as the anode, and the metal nickel is used as the cathode to make the nickel dissolve on the surface of the foamed nickel through electrolysis, then using heat treatment to increase the surface roughness of the material and facilitate subsequent electroplating nickel-tungsten alloy process; while using this method, the dissolved nickel in the process is returned to the anode module, which not only recycles nickel resources, but also prevents the generation of dangerous gas of hydrogen and toxic gas of chlorine, so as to achieve a green environmental protection method for nickel recycling. This method is simple and practical, and the roughness of the product can be controlled by the dissolution time.

3. For sponges with an average pore diameter of 30~50 µm, a filament diameter of 5~30 µm, and a porosity of more than 75%, the existing process is difficult to apply nickel-coating with enough deepness on the sponge, that is, the plating dispersity is poor. In this invention, it is preferably used a lower frequency ultrasonic-assisted electroless plating process, which can greatly improve the electroplating dispersity performance of the conductive sponge nickel and make the nickel coating of the material more uniform.

4. In the optimized scheme of the preparation method of the invention, before the sponge nickel is incinerated, it is sprayed with water to maintain a certain water content, so that during the incineration process, the decomposition of the sponge and the volatilization of water vapor will make the product form large number of micro-pores, so as to increase the specific surface area of the nickel foam for the second time, and achieve the effect of increasing the heat dissipation function of the product.

DETAILED DESCRIPTION

Embodiment 1

A preparation method of the matrix material for the gas diffusion layer of the polymer electrolyte membrane fuel cell, the steps are as follows:

Step 1: Place a nano sponge with thickness of 0.5 mm, filament diameter of 6.5 μm, and an average pore diameter of 40 μm in a bath with electroless nickel plating solution, applied by ultrasonic waves with an adjustable frequency of 15~18 KHz, with electroless nickel plating for 5 minutes; in the electroless nickel plating solution, the concentration of nickel sulfate is 35 g/L, the concentration of sodium citrate is 25 g/L, the concentration of sodium hypophosphite is 50 g/L, and the concentration of lactic acid is 4 mL/L, the concentration of sodium thiosulfate is 3 g/L, the pH value of the electroless nickel plating solution is controlled as 8.0, and the temperature of the electroless nickel plating solution is controlled as 60° C.

Step 2: The matrix material of sponge which was conductively treated in step 1 is placed in the electroplating nickel solution, and the electroplating is divided into two levels. The electroplating current density of the first level electroplating nickel is 2 A/dm$^2$, the electroplating time is 1 min, the electroplating current density of secondary electroplating nickel is 20 A/dm$^2$, and the electroplating time is 55 min; the amount of nickel metal covered is 2000 grams. The nickel electroplating solution is: the concentration of boric acid is 45 g/L, the concentration of nickel sulfate is 30 g/L, the concentration of nickel chloride is 50 g/L, the pH value of the nickel plating solution is controlled as 4; the temperature of the nickel plating solution as 45° C.

Step 3: Place the nickel-plated material in step 2 in the same nickel electroplating solution as the above-mentioned nickel electroplating, use the nickel-plated material as the anode and the nickel metal module as the cathode, apply electrolytic treatment for 10 min, wherein the temperature of the electroplating nickel-plating solution is 30° C., and the electroplating current density is 30 A/dm$^2$.

Step 4: After the electrolytic treatment of step 3, the sponge nickel material is sprayed with distilled water to keep the water content of the product at 30~40%, and immediately enter an oxygen-containing environment such as an incinerator for incineration, and then in a furnace containing a mixed atmosphere of hydrogen and nitrogen, heat treatment is performed at 1000° C. based on 15 minutes per square meter of material to form a porous nickel material.

Step 5: The porous nickel material after heat treatment in step 4 is placed in a tungsten electroplating solution for electroplating nickel-tungsten alloy. The tungsten electroplating solution is with the concentration of nickel sulfate 45 g/L, the concentration of sodium tungstate 80 g/L, the concentration of triamine citrate 30 g/L, and the pH controlled as 6.5; the temperature of the electroplating tungsten solution 55° C., the electroplating current density 15 A/dm$^2$, and the electroplating time 15 min.

Step 6: Place the nickel-tungsten alloy coated porous material obtained in step 5 in a heat treatment furnace containing a mixed atmosphere of nitrogen and hydrogen at 1100° C., with heat treatment based on 40 minutes per square meter of material.

Step 7: The porous nickel-tungsten metal material after the heat treatment in step 6 is rolled to 0.1 mm, using a rubber roller with a roller diameter of 250 mm and a roller weight of 350 kg, with rolling time based on 40 seconds per square meter of material.

The matrix material for the gas diffusion layer of polymer electrolyte membrane fuel cells prepared by the above steps is, upon testing, with the total metal content 2400 grams per square meter, wherein the mass content of metal nickel is 89.3%, and the mass content of metal tungsten is 10.5%, the rest are impurities.

The matrix material for the gas diffusion layer of polymer electrolyte membrane fuel cell prepared by the above steps has been tested for various performances, the test data obtained is as follows: the specific surface area is 1.5×10$^5$ m$^2$/m$^3$, the porosity is 82%, the average pore diameter is 40 μm, the filament diameter is 6.5 μm, the longitudinal air permeability of the material is 2300 m/mm/(cm$^2$ hmmAq), the longitudinal resistivity is 30 mΩ·cm, the sheet resistivity is 2.1 mΩ·cm, and the contact resistance is 3 mΩ·cm, the tensile strength is 75 Mpa, the thermal conductivity in the longitudinal direction is 1.95 W/(m k), the thermal conductivity in the transverse direction is 23 W/(m·k). The above-mentioned material is used as the positive electrode, the calomel electrode is used as the negative electrode, the sodium chloride aqueous solution is used as the electrolyte solution, after being treated the applied potential of 1.45V for 75 h, and the weight loss rate of the material is 3.5%.

Embodiment 2

A preparation method of the matrix material for the gas diffusion layer of the polymer electrolyte membrane fuel cell, the steps are as follows:

Step 1: Place a nano sponge with thickness of 0.5 mm, filament diameter of 5 μm, and an average pore diameter of 50 μm in a bath with electroless nickel plating solution, applied by ultrasonic waves with an adjustable frequency of 15~18 KHz, with electroless nickel plating for 5 minutes; in the electroless nickel plating solution, the concentration of nickel sulfate is 35 g/L, the concentration of sodium citrate is 25 g/L, the concentration of sodium hypophosphite is 50 g/L, and the concentration of lactic acid is 4 mL/L, the concentration of sodium thiosulfate is 3 g/L, the pH value of the electroless nickel plating solution is controlled as 8.0, and the temperature of the electroless nickel plating solution is controlled as 65° C.

Step 2: The matrix material of sponge which was conductively treated in step 1 is placed in the electroplating nickel solution, and the electroplating is divided into two levels. The electroplating current density of the first level electroplating nickel is 2 A/dm$^2$, the electroplating time of the first level electroplating nickel is 1 min, the electroplating current density of secondary electroplating nickel is 12 A/dm$^2$, and the electroplating time is 55 min; the amount of nickel metal covered is 2000 grams. The nickel electroplating solution is: the concentration of boric acid is 45 g/L, the concentration of nickel sulfate is 30 g/L, the concentration of nickel chloride is 50 g/L, the pH value of the nickel plating solution is controlled as 4; the temperature of the nickel plating solution as 45° C.

Step 3: Place the nickel-plated material in step 2 in the same nickel electroplating solution as the above-mentioned nickel electroplating, use the nickel-plated material as the anode and the nickel metal module as the cathode, apply electrolytic treatment for 60 min, where the temperature of the electroplating nickel-plating solution is 40° C., and the electroplating current density is 10 A/dm$^2$.

Step 4: After the electrolytic treatment of step 3, the sponge nickel material is sprayed with distilled water to keep the water content of the product at 30~40%, and immediately enter an oxygen-containing environment such as an incinerator for incineration, and then in a furnace containing a mixed atmosphere of hydrogen and nitrogen, heat treatment is performed at 1100° C. based on 10 minutes per square meter of material to form a porous nickel material.

Step 5: The porous nickel material after heat treatment in step 4 is placed in a tungsten electroplating bath for electroplating nickel-tungsten alloy. The tungsten electroplating bath is with the concentration of nickel sulfate 45 g/L, the concentration of sodium tungstate 80 g/L, the concentration of triamine citrate 30 g/L, and the pH controlled as 6.5; the temperature of the electroplating tungsten solution controlled as 55° C., the electroplating current density controlled as 15 A/dm$^2$, and the electroplating time controlled as 10 min.

Step 6: Place the nickel-tungsten alloy coated porous material obtained in step 5 in a heat treatment furnace containing a mixed atmosphere of nitrogen and hydrogen at 800° C., with heat treatment based on 50 minutes per square meter of material.

Step 7: The porous nickel-tungsten metal material after the heat treatment in step 6 is rolled to 0.15 mm, using a rubber roller with a roller diameter of 300 mm and a roller weight of 380 kg, with rolling time based on 60 seconds per square meter of material.

The matrix material for the gas diffusion layer of polymer electrolyte membrane fuel cells prepared by the above steps is, upon testing, with the total metal content 2300 grams per square meter, wherein, the mass content of metal nickel is 91%, and the mass content of metal tungsten is 8.9%, the rest are impurities.

The matrix material for the gas diffusion layer of polymer electrolyte membrane fuel cell prepared by the above steps has been tested for various performances. The test data obtained is as follows: the specific surface area is $1.5 \times 10^5$ m$^2$/m$^3$, the porosity is 85%, the average pore diameter is 50 m, the filament diameter is 5 μm, the longitudinal air permeability of the material is 2480 m/mm/(cm$^2$ hmmAq), the longitudinal resistivity is 35 mΩ·cm, the resistivity of the sheet resistivity is 3.1 mΩ·cm, and the contact resistance is 3.5 mΩ·cm, the tensile strength is 55 Mpa, the thermal conductivity in the longitudinal direction is 2.1 W/(m·k), the thermal conductivity in the transverse direction is 25 W/(m·k). The above-mentioned material is used as the positive electrode, the calomel electrode is used as the negative electrode, the sodium chloride aqueous solution is used as the electrolyte solution, after being treated with the applied potential of 1.45V for 75 h, the weight loss rate of the material is 4%.

What is claimed:

1. A preparation method of a matrix material for a gas diffusion layer of a fuel cell, comprising:
   subjecting a polyurethane sponge with a thickness of 0.5 to 1 mm to a conductivity treatment to form a conductive polyurethane sponge;
   depositing metallic nickel on the conductive polyurethane sponge by electroplating to from a sponge nickel material;
   using the sponge nickel material as an anode, a metallic nickel as a cathode, and an electrolytic nickel as an electrolytic solution, performing a second electroplating treatment on the sponge nickel material under the conditions including a current density of 10 to 30 A/dm$^2$ and a temperature of 30 to 40° C. for 10 to 60 minutes to form an electrolytically treated sponge nickel material;
   incinerating the electrolytically treated sponge nickel material in an oxygen-containing environment for incineration which is followed by a heat-treatment step based on 10 to 20 minutes per square meter of the material in a reducing atmosphere at 800 to 1100° C. to form a porous nickel material;
   electroplating the porous nickel material with nickel-tungsten alloy to form a nickel-tungsten alloy coated porous material;
   performing a second heat-treatment step based on 10 to 60 minutes per square meter of material to form a porous nickel-tungsten metal material, and
   performing a rolling process on the porous nickel-tungsten metal material to a thickness of 0.1 to 0.2 mm to form the matrix material for a gas diffusion layer of a fuel cell, wherein the matrix material for a gas diffusion layer includes a total metal content per square meter of the matrix material to be 1500 to 3000 grams in which the mass content of metallic nickel is 88% to 92%, the mass content of metallic tungsten is 8% to 12%, and the remainder includes impurities.

2. The preparation method of the matrix material for the gas diffusion layer of a fuel cell according to claim 1, wherein the average pore diameter of the polyurethane sponge is 30~50 μm.

3. The preparation method of the matrix material for the gas diffusion layer of a fuel cell according to claim 1, wherein the conductive treatment process comprises electroless nickel plating to plate nickel on polyurethane sponge, wherein the temperature of the plating solution is 60 to 70° C., and wherein ultrasonic treatment with a frequency of 15 to 18 KHz is used during plating for 2 to 5 minutes.

4. The preparation method of the matrix material for the gas diffusion layer of a fuel cell according to claim 3, wherein, before the electrolytically treated sponge nickel material is incinerated in an oxygen-containing environment, water is sprayed uniformly on the material to keep the water content of the material at 30~40%.

5. The preparation method of the matrix material for the gas diffusion layer of a fuel cell according to claim 3, wherein the rolling process is that a metal alloy roller with diameter of 250~300 mm and weight of 350~380 KG is used, and the rolling time is 6~60 seconds per square meter of material.

6. The preparation method of the matrix material for the gas diffusion layer of a fuel cell according to claim 1, wherein, before the electrolytically treated sponge nickel material is incinerated in an oxygen-containing environment, water is sprayed uniformly on the material to keep the water content of the material at 30~40%.

7. The preparation method of the matrix material for the gas diffusion layer of a fuel cell according to claim 6, wherein the rolling process is that a metal alloy roller with diameter of 250~300 mm and weight of 350~380 KG is used, and the rolling time is 6~60 seconds per square meter of material.

8. The preparation method of the matrix material for the gas diffusion layer of a fuel cell according to claim 1, wherein the rolling process is that a metal alloy roller with diameter of 250~300 mm and weight of 350~380 KG is used, and the rolling time is 6~60 seconds per square meter of material.

* * * * *